United States Patent
Hirt et al.

(10) Patent No.: US 7,061,146 B2
(45) Date of Patent: Jun. 13, 2006

(54) DRIVE ARRANGEMENT WITH A FIXED BEARING

(75) Inventors: Joachim Hirt, Oberkirch (DE); Norbert Esly, Bühl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/711,830

(22) Filed: Oct. 7, 2004

(65) Prior Publication Data

US 2005/0082918 A1    Apr. 21, 2005

Related U.S. Application Data

(63) Continuation of application No. PCT/DE03/01186, filed on Apr. 10, 2003.

(30) Foreign Application Priority Data

Apr. 10, 2002    (DE)    ............... 102 15 715
Sep. 5, 2002    (DE)    ............... 102 41 068

(51) Int. Cl.
*H02K 1/04*    (2006.01)
(52) U.S. Cl. ........................ 310/43; 310/71
(58) Field of Classification Search .................. 310/43, 310/71, 68 B, 90, 89
See application file for complete search history.

(56) References Cited

U.S. PATENT DOCUMENTS

| | | | | |
|---|---|---|---|---|
| 4,866,317 A | * | 9/1989 | Katayama | 310/89 |
| 4,902,941 A | * | 2/1990 | Merkle et al. | 310/216 |
| 5,073,735 A | * | 12/1991 | Takagi | 310/71 |
| 5,394,043 A | * | 2/1995 | Hsia | 310/90 |
| 5,532,533 A | | 7/1996 | Mizutani | 310/68 B |
| 5,610,458 A | * | 3/1997 | Baker et al. | 310/68 R |
| 5,770,902 A | * | 6/1998 | Batten et al. | 310/71 |
| 6,753,629 B1 | * | 6/2004 | Doi et al. | 310/68 D |
| 2002/0030415 A1 | | 3/2002 | Morooka et al. | 310/68 R |

FOREIGN PATENT DOCUMENTS

GB    1087793    10/1967

* cited by examiner

*Primary Examiner*—Dang Le
(74) *Attorney, Agent, or Firm*—Simpson & Simpson, PLLC (57) ABSTRACT

The invention relates to a drive arrangement with a unit comprising stator, rotor and fixed bearing in which a shaft of the motor is mounted, housed in a motor housing. An injection molded piece comprises a plug piece on an external annular piece, which comprises a branch supply line, connected to the coil of the stator and a sensor line connected to a sensor circuit board, whereby said sensor circuit board comprises at least one sensor. The injection molded piece further comprises an inner annular piece in which the fixed bearing is arranged on the side axially opposed to the shaft output of the drive arrangement.

15 Claims, 5 Drawing Sheets

DRIVE ARRANGEMENT WITH A FIXED BEARING

CROSS REFERENCE TO RELATED APPLICATIONS

This application is filed under 35 U.S.C §120 and §365(c) as a continuation of International Patent Application PCT/DE03/01186, filed Apr. 10, 2003, which application is incorporated herein by reference. This application also claims priority of German Patent Application Nos. filed 102 15 715.4 filed Apr. 10, 2002, and 102 41 068.2 filed Sep. 5, 2002, which applications are incorporated herein by reference.

BACKGROUND OF THE INVENTION

The present invention relates to a motor arrangement having a unit comprising stator and rotor that can be mounted in a motor housing and having a rotor shaft mounted in a fixed bearing.

Typically, in known motor arrangements the fixed bearing is mounted on the side of the shaft output of the motor.

OBJECTS OF THE INVENTION

The object of the present invention is to improve the performance of such a motor when there are vibrating stresses.

BRIEF SUMMARY OF THE INVENTION

This objective is achieved via a motor arrangement in which an injection-molded part is provided comprising a plug part on an outer annular part that has a branch supply line connected to the coil of the stator and a sensor line connected to the sensor circuit board, the circuit board having at least one sensor. The injection-molded part further comprises an inner annular part in which the fixed bearing is mounted on the side axially opposed to the shaft output of the motor arrangement.

The important advantage of the present invention is that, because of the arrangement of the fixed bearing on the side axially opposed to the motor, the center of gravity of the present motor arrangement can be displaced further in the direction of the screw-on surface of the motor housing, whereupon the performance of the motor arrangement according to the invention in response to vibration stresses is improved. The fixed bearing in this context may preferably be mounted in a bearing holding part of the inner annular part or be supported against it.

In a preferred embodiment of the invention, the sensor circuit board is fixed to the inner annular part. However, it may also be held by the sensor line that is fixed in the outer annular part. The sensor circuit board preferably also has an electric component that works together with the sensor.

The branch supply line and the sensor line are expediently produced in the form of a pressed screen, the areas of the lines leading to the sensor circuit board or the stator leading to the sensor circuit board are fixed or embedded in the outer annular part. During the production of the motor arrangement, the lines connected to each other via an exterior jumper part in the pressed screen can be disconnected from each other during the production of the motor arrangement by removing the jumper part at an appropriate moment.

Between the outer annular part and the inner annular part of the injection-molded part, there exists essentially one channel in which the ends of the branch supply line and the sensor line are accessible along with the stator coil or the sensor circuit board before introduction of a molding compound. In this way, the electrical connections between the sensor circuit board and the sensor line as well as between the stator coil and the branch supply line can easily be produced because of the good accessibility.

The plug part or its body is integrally molded on the perimeter of the outer annular part, areas of the branch supply line and the sensor line being embedded in the body of the plug part. This results in an especially good fixation of the aforementioned lines. In an especially preferred embodiment of the invention, seals for the tight fitting of the motor housing and/or the tight fitting of a covering part, which are annular on the inside when viewed radially, are disposed, preferably integrally molded on the body of the plug part.

The fixed bearing is fixed by a fixation part supported at the inner annular part. The side of the stator facing the plug part preferably engages in a receiving opening of the body of the plug part. The intermediate space between the outer and inner annular parts, the areas of the branch supply line arranged therein and the sensor line, as well as possibly the fixation part and the stator, are molded by a molding compound into a unit and fixed to each other. An especially stable unit is produced if the molding compound also surrounds and fixes the outer side and the side of the stator that faces away from the plug part. The rotor along with the shaft and a floating bearing mounted thereon on the side facing away from the plug part are installed in the stator in such a manner that the area of the shaft passing through the fixed bearing is preferably attached on the outer side via shoulders. The floating bearing may likewise be attached to the shaft via shoulders. In one production step, the motor housing is axially pushed onto the stator and the floating bearing and placed against the body of the plug part and fixed to it. In this context it is advantageous that the force at work here is guided via the stator block. Especially advantageously, an attachment area of a cover part mounted from the fixed bearing side overlaps the end of the motor housing that faces the cover part. In this way, the motor housing and the cover part, on the one hand, are attached to each other and, on the other hand, are also attached to the unit of the motor arrangement.

BRIEF DESCRIPTION OF THE DRAWINGS

The motor arrangement of the present invention and its embodiments are explained in detail below in connection with the figures. In the drawing.

DETAILED DESCRIPTION OF THE PREFERRED EMBODIMENT

According to FIG. 1, a so-called pressed screen of the aforementioned motor arrangement comprises a sensor line 2 and branch supply line 3 that are connected to each other via the jumper part 4 (dashed line), which may be detached later at an appropriate point in time. The sensor line 2 and the branch supply line 3 are fixed in an injection-molded part 5, which is preferably configured in the shape of a ring and has an outer annular part 5-1 and an inner annular part 5-2. The aforementioned lines 2, 3 are preferably partially embedded in outer annular part 5-1.

Pins 6, which hold a sensor circuit board 7 and preferably are thermoformed for the attachment of sensor circuit board 7, are preferably mounted on inner annular part 5-2 of the injection-molded part 5. Sensor circuit board 7 may also be accommodated or held by pressed screen 3. It is connected to pressed screen 3 in an electrically conductive manner via an axial channel 9 by an addition of heat. Pressed screen 3 may be separated by detachment of the jumper part 4 in individual lines 2 and 3. Sensor circuit board 7, which comprises a sensor (not described in detail) and preferably also electronics, may be electrically tested after detachment of jumper part 4. Injection-molded part 5 then holds pressed screen 3 and sensor circuit board 7, and it preferably includes bearing surfaces of a bearing holding part 8 for fixed bearing 14 of the motor arrangement.

In an alternative embodiment, inner annular part 5-2 of injection-molded part 5 has no bearing holding part. The fixed bearing is axially braced in this case directly against bearing surface 1 of inner annular part 5-2.

Injection-molded part 5 has at least one channel 9 that preferably extends in the axial direction to both sides and opens and through which runs the end region of branch supply line 3 that is arranged within injection-molded part 5 for later contacting. Also, the end of sensor line 2 is accessible in channel 9 for contacting.

Figure 2:
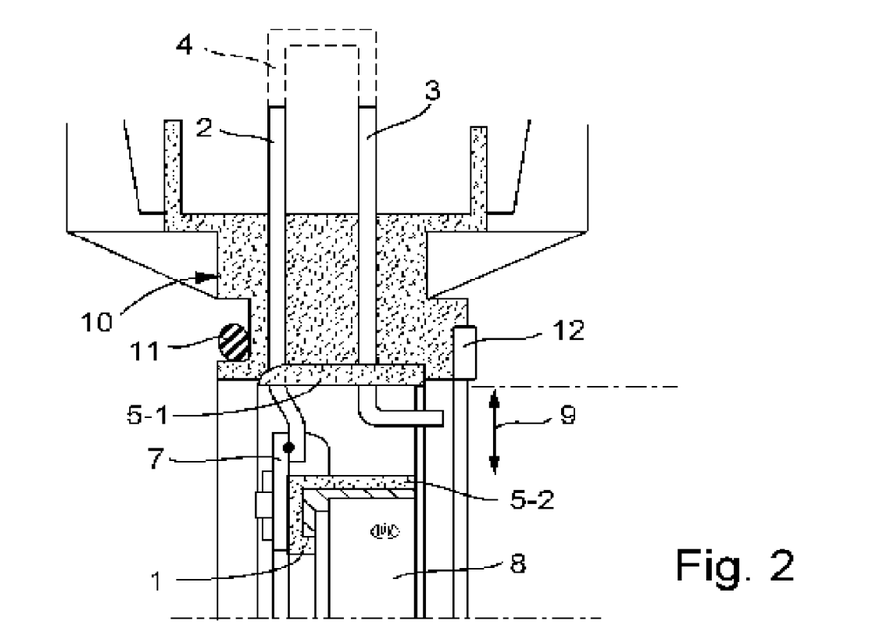
FIG. 2 shows the plug part of the motor arrangement of the invention.
Figure 6:
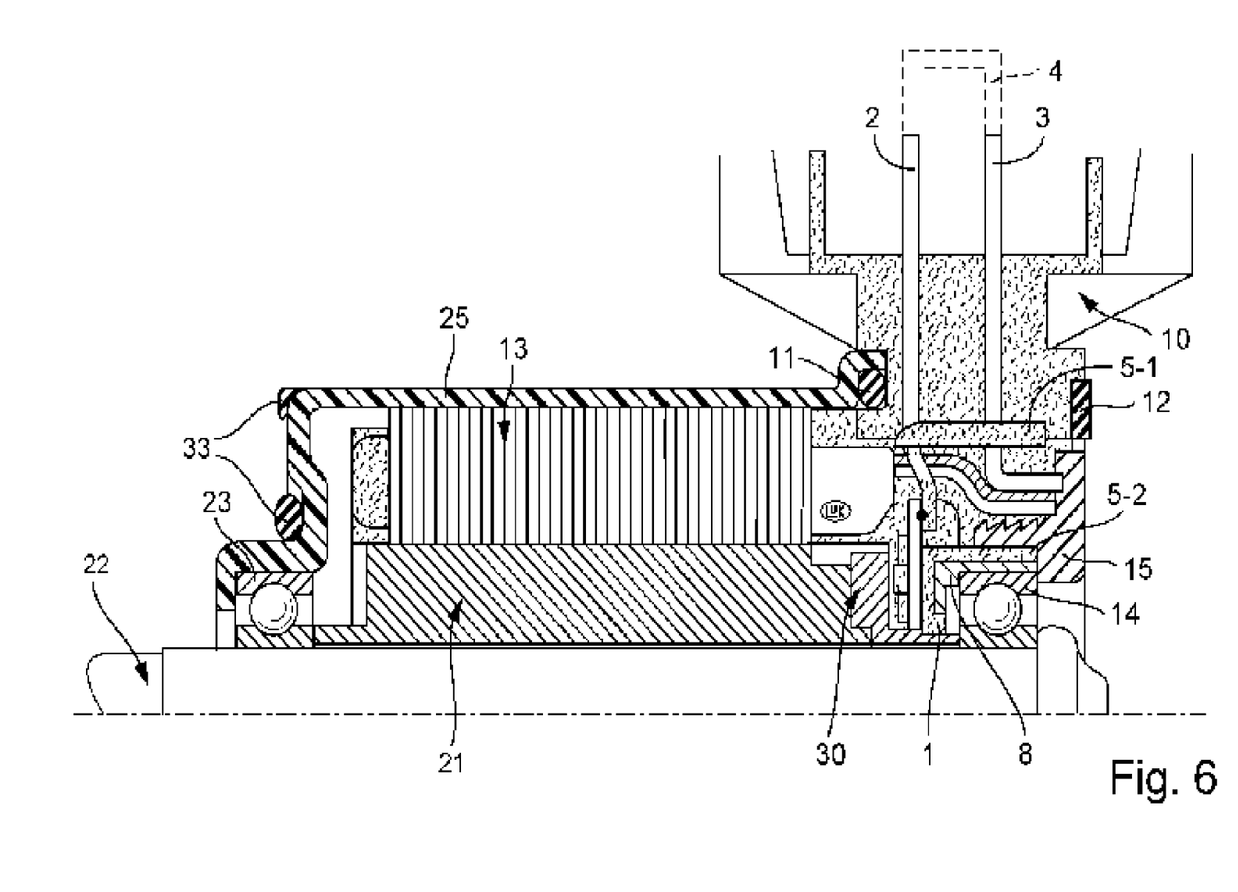
FIG. 6 shows the mounting of the motor housing on the arrangement of FIG. 5; and, FIG. 7 shows the finished motor arrangement of the invention.

According to FIG. 2 plug part 10 is integrally molded on injection-molded part 5, more precisely on outer annular part 51 of said injection-molded part. Plug part 10 comprises all functions of the plug part and also holds the injection-molded part along with pressed screen 1 or lines 2, 3 and sensor circuit boards. Moreover, plug part 10 also has radial contours for later accommodation or mounting and connection to a motor housing 25 (FIG. 6). Seals 11, 12, which enable a tight connection to motor housing 25 and a cover part 26 (as will be explained later), can be arranged, preferably integrally molded, on plug part 10 on both sides of plug part 10. In the arrangement of seals 11, 12, one must make sure that they completely define the sealing surfaces on the body of plug part 10 in order to prevent an infiltration between plug part 10 and injection-molded part 5. The maximum permissible temperatures for sensor circuit boards 7 and their connections must be observed during the injection of plug part 10.

According to FIGS. 3 and 4, stator 13, plug part 10, fixed bearing 14 and bearing mount 15 are situated below via an apparatus. Coil branch 16 and sensor circuit board 7 are electrically conductively connected to the branch supply line 2 or sensor line 3. Axial channels 9 of injection-molded part 5 provide the suitable space for this. The apparatus for placement provides the possibility for aligning the sensors with the coils. This occurs with a magnet 30 defined for stator 13 (FIG. 5). In this way an optimized commutation signal and, thus, a better motor utilization is achieved. For the alignment, the stator coils and sensors might also be contacted via plug part 10 and the alignment achieved via the created fields. A mechanical assignment of coil to sensor via the apparatus is possible. Fixed bearing 14 and then its fixation part 15 are inserted into inner annular part 5-2, which is connected to plug part 10. They are axially held (possibly with pre-tensioning).

Figure 4:
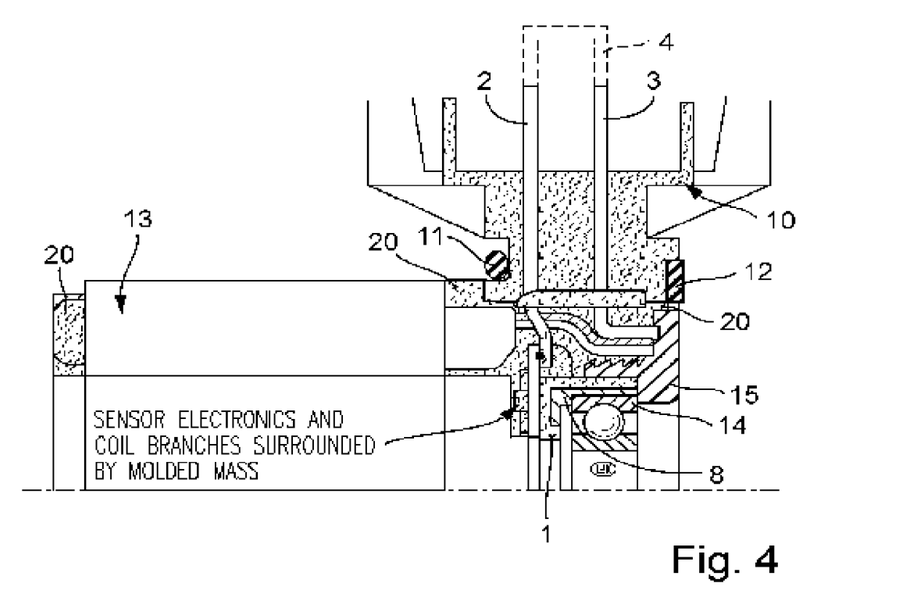
FIG. 4 shows the stator block of FIG. 3 in the molded state.
Figure 5:
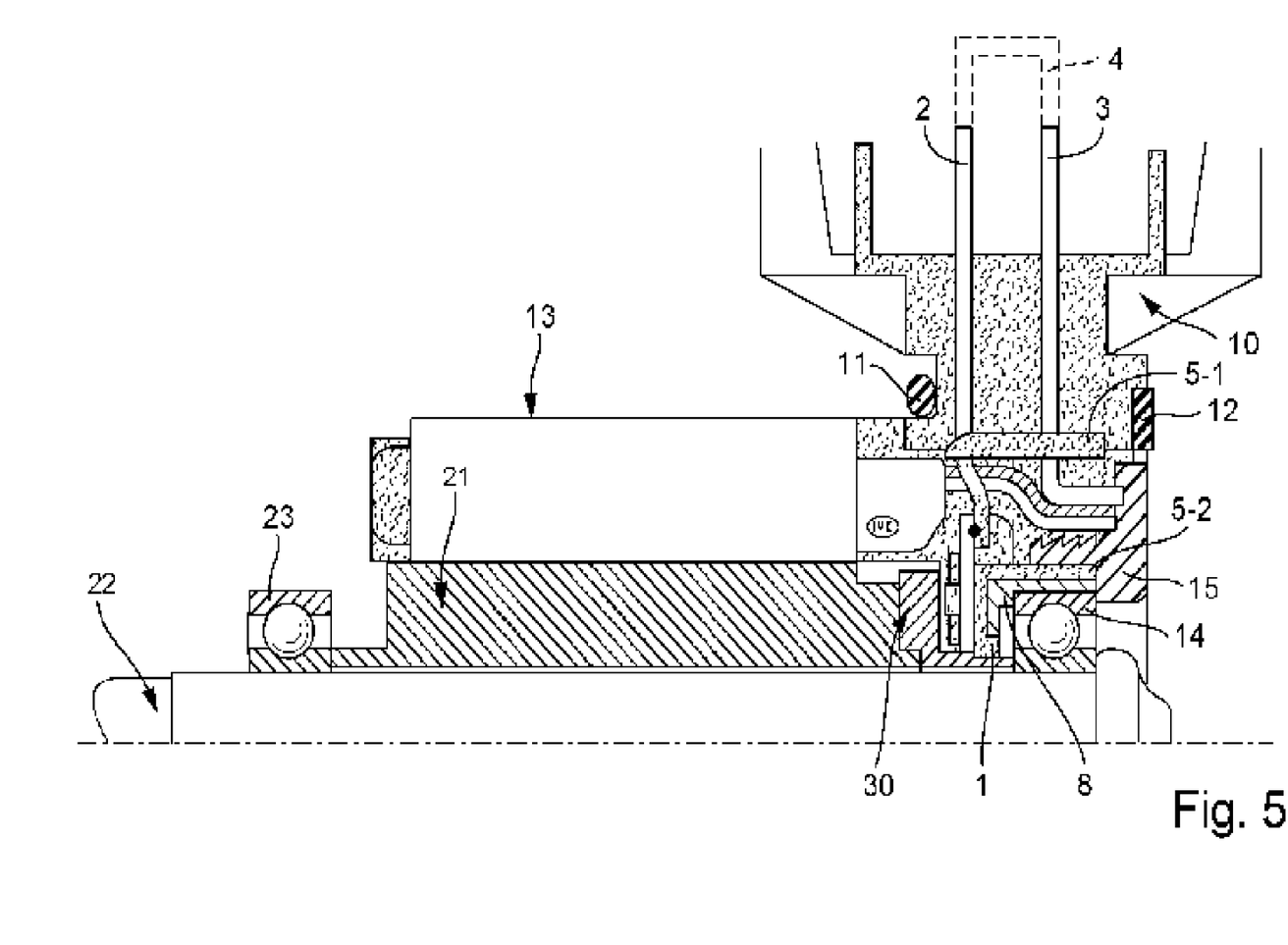
FIG. 5 shows the insertion of the rotor assembly group in the motor arrangement of the invention.

According to FIG. 4, the coil form of stator 13, together with plug part 10 and inserted fixed bearing 14, along with its fixation part 15, are molded into one unit using a suitable molding compound 20. In this way, the complete sealing of the geometries is achieved. Stator 13 is axially and radially sealed in order to fix the cylinder mold and the windings. Molded mass 20 also encloses sensor circuit board 7 together with its electronic components (sensors and electronics) one. Fixed bearing 14 is held between injection-molded part 5 (or plug part 10) and fixation part 15. The molded parts preferably each have undercuts in order to ensure a form fitting with molded mass 20. One must pay attention to the material of molding compound 20 and its compatibility with the other materials and surfaces. With thermoset plastics, one must watch out, for example, for the gas evolution and etching of the circuit boards as well as the sealants and materials. With thermoplastics one must pay attention to the temperature compatibility of the individual components and with plastics to lagging and shrinkage behavior in general. The unit produced in this way may also be used without an additional motor housing. It can be pushed into an electric motor housing or, for example, a transmission housing.

According to FIG. 5, the assembly group comprising rotor 21 and motor shaft 22 is then mounted together with an added floating bearing 23 for the floating bearing point, spacer ring, magnet packet and control magnet 30 aligned therewith. In the process, motor shaft 22 is inserted in fixed bearing 14 and, as is evident, preferably firmly buttressed.

The unit that then exists may be tested without a motor housing in an apparatus.

According to FIG. 6, the aforementioned unit may be used in an associated motor housing 25 to construct a drive pinion or in a suitable screw-down geometry. When the stator is pressed into motor housing 25, the force runs through the stator block.

The shaft seal, flange gasket 33 and gasket 11 between stator block and motor housing 25 may be applied, for example, vulcanized on motor housing 25.

Figure 7:
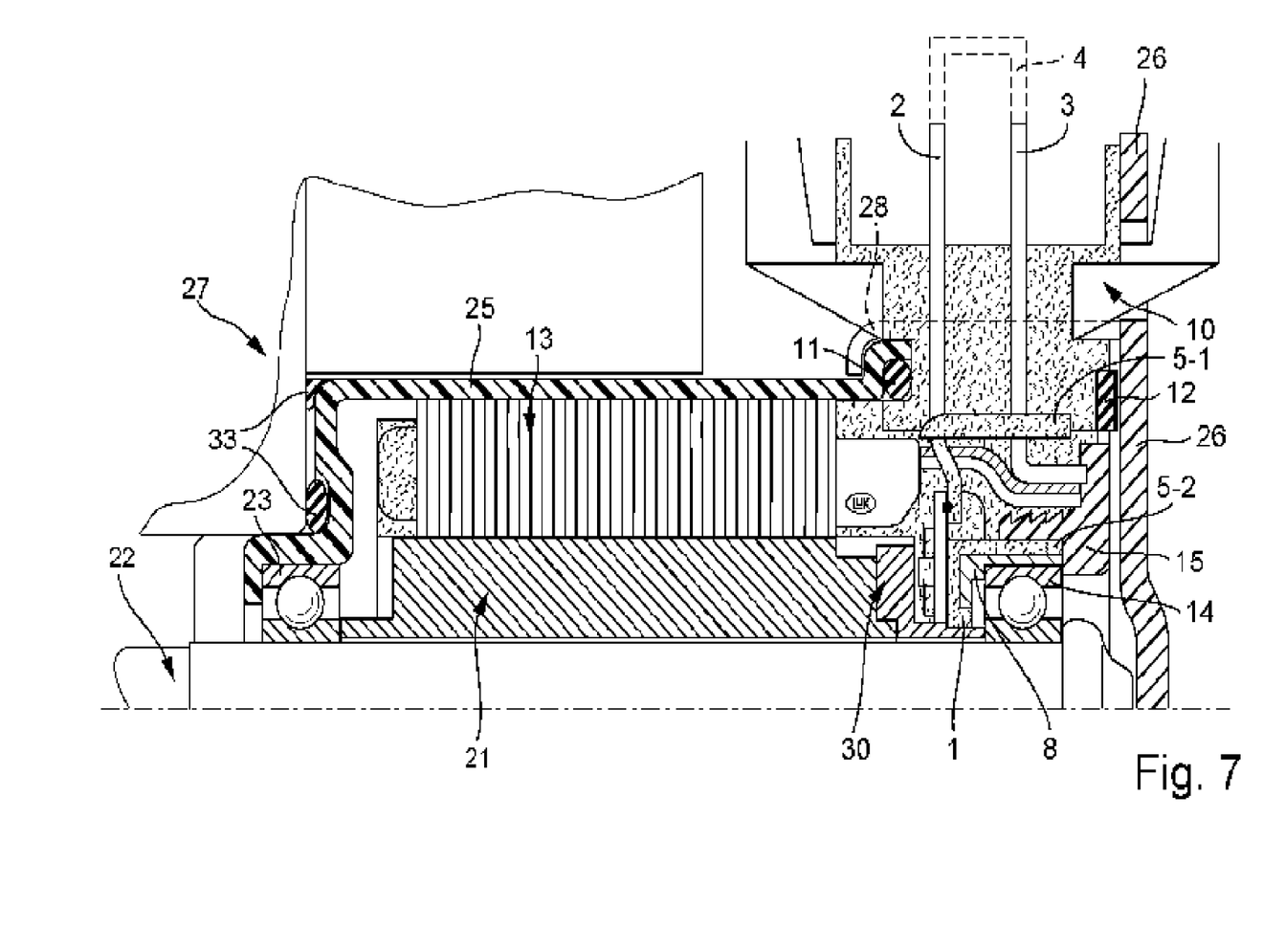

FIG. 7 shows the motor arrangement that is screwed into different planes with screw-down parts 27. The cover part 26 engages behind motor housing 25 with an attachment area 28 that preferably runs axially through the body of plug part 10 or is squeezed against it.

The patent claims submitted with the application are proposed formulations without prejudice to the achievement of further patent protection. The applicant reserves the right to submit claims for further combinations of features previously only disclosed in the description and/or the drawings.

References used in the dependent claims refer to the further development of the subject matter of the principal claim via the features of the particular dependent claim, they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

What is claimed is:

1. A motor arrangement having a unit comprising stator and rotor that can be mounted in a motor housing and having a rotor shaft mounted in a fixed bearing, wherein an injection-molded part is provided that on an outer annular part has a plug part, which includes a branch supply line connected to the coil of the stator and a sensor line connected to a sensor circuit board, the sensor circuit board having at least one sensor, and the injection-molded part having an inner annular part in which the fixed bearing is mounted against the side that faces axially away from the shaft output of the motor arrangement and wherein said output end of said shaft is mounted on a floating bearing.

2. The motor arrangement as described in claim 1, wherein the sensor circuit board is fixed to the inner annular part.

3. The motor arrangement as described in claim 1, wherein the sensor circuit board (7) is held by the sensor line, which is fixed in the outer annular part.

4. The motor arrangement as described in claim 1, wherein the sensor circuit board includes an electrical component that cooperates with the sensor.

5. The motor arrangement as described in claim 1, wherein the branch supply line and the sensor line (2) have the form of a pressed screen and are connected to each other via a detachable jumper part situated on the exterior, the areas leading to the sensor circuit board or the stator being fixed or embedded in the outer annular part.

6. The motor arrangement as described in claim 1, wherein there is at least one channel between the outer annular part and the inner annular part of the injection-molded part in which the ends of the branch supply line and the sensor line (2) are accessible for contacting with the stator coil or the sensor circuit board before introduction of the molding compound.

7. The motor arrangement as described in claim 1, wherein the plug part is integrally molded on the perimeter of the outer annular part, areas of the branch supply line (3) and the sensor line being embedded in the body of the plug part.

8. The motor arrangement as described in claim 7, wherein interior annular seals, which are annular on the inside when viewed radially, are arranged, preferably integrally molded, on the body of the plug part for tight fitting of the motor housing on the side facing away from the fixed bearing and/or for tight fitting of a cover part on the side facing the fixed bearing.

9. The motor arrangement as described in claim 1, wherein the fixed bearing that is mounted in a bearing holding part of the inner annular part or the fixed bearing that braces directly against a bearing face of the inner annular part is fixed by a fixation part bracing against the inner annular part.

10. The motor arrangement as described in claim 1, wherein the side of the stator facing the plug part engages in a receiving opening of the body of the plug part.

11. The motor arrangement as described in claim 1, wherein the intermediate space between the outer and inner annular part, the areas of the branch supply line and the sensor line disposed therein and in some cases of the fixation part (15) and the stator are molded by a molding compound to form one unit and fixed to each other.

12. The motor arrangement as described in claim 11, wherein the molding compound also surrounds and fixes the outer side and the side of the stator that faces away from the plug part.

13. The motor arrangement as described in claim 1, wherein the rotor, along with its shaft and a floating bearing mounted thereon on the side facing away from the plug part, is inserted in the stator, the area of the shaft passing through the fixed bearing being attached on the outer side to the fixed bearing, preferably via shoulders.

14. The motor arrangement as described in claim 13, wherein the motor housing (25) is axially pushed onto the stator and the floating bearing and placed against the body of the plug part and fixed thereto.

15. The motor arrangement as described in claim 8, wherein the cover part is mounted on the side facing the fixed bearing and is connected via an attachment part to the side of the motor housing that faces the fixed bearing.

* * * * *

UNITED STATES PATENT AND TRADEMARK OFFICE
CERTIFICATE OF CORRECTION

| | | |
|---|---|---|
| PATENT NO. | : 7,061,146 B2 | Page 1 of 5 |
| APPLICATION NO. | : 10/711830 | |
| DATED | : June 13, 2006 | |
| INVENTOR(S) | : Hirt et al. | |

Figure 1:
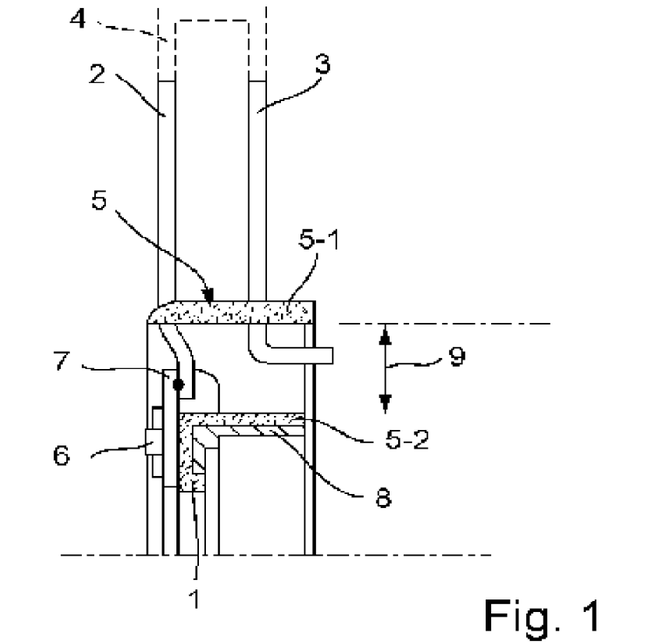
FIG. 1 shows a pressed screen and sensor circuit board of the motor arrangement of the invention.

It is certified that error appears in the above-identified patent and that said Letters Patent is hereby corrected as shown below:

Delete Fig. 1. and replace with the following Fig. 1.

Fig. 1

UNITED STATES PATENT AND TRADEMARK OFFICE
CERTIFICATE OF CORRECTION

PATENT NO.       : 7,061,146 B2
APPLICATION NO. : 10/711830
DATED            : June 13, 2006
INVENTOR(S)      : Hirt et al.

It is certified that error appears in the above-identified patent and that said Letters Patent is hereby corrected as shown below:

Delete fig. 2. and replace with the following Fig 2.

Fig. 2

UNITED STATES PATENT AND TRADEMARK OFFICE
CERTIFICATE OF CORRECTION

| | |
|---|---|
| PATENT NO. | : 7,061,146 B2 |
| APPLICATION NO. | : 10/711830 |
| DATED | : June 13, 2006 |
| INVENTOR(S) | : Hirt et al. |

Figure 3:
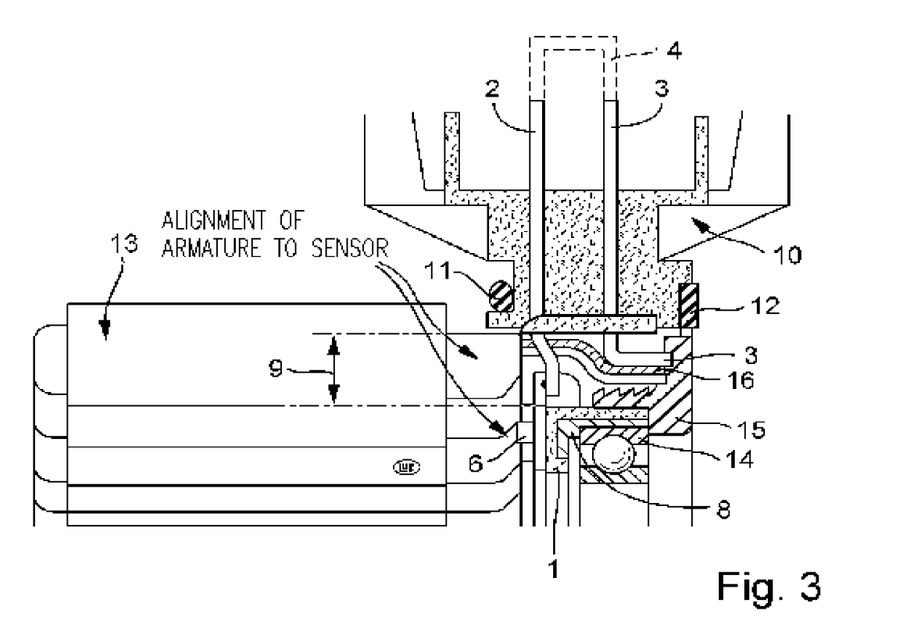
FIG. 3 shows the stator block of the motor arrangement of the invention.

It is certified that error appears in the above-identified patent and that said Letters Patent is hereby corrected as shown below:

Delete Fig. 3. and replace with the following Fig 3.

UNITED STATES PATENT AND TRADEMARK OFFICE
CERTIFICATE OF CORRECTION

PATENT NO. : 7,061,146 B2
APPLICATION NO. : 10/711830
DATED : June 13, 2006
INVENTOR(S) : Hirt et al.

It is certified that error appears in the above-identified patent and that said Letters Patent is hereby corrected as shown below:

Delete fig. 4. and replace with the following Fig. 4.

Fig. 4

UNITED STATES PATENT AND TRADEMARK OFFICE
CERTIFICATE OF CORRECTION

PATENT NO. : 7,061,146 B2
APPLICATION NO. : 10/711830
DATED : June 13, 2006
INVENTOR(S) : Hirt et al.

It is certified that error appears in the above-identified patent and that said Letters Patent is hereby corrected as shown below:

Delete Fig. 6. and replace with the following Fig. 6.

Fig. 6

Signed and Sealed this

Twentieth Day of February, 2007

JON W. DUDAS
*Director of the United States Patent and Trademark Office*